INVENTOR.
FRANK C. POWERS
BY
ATTORNEYS

United States Patent Office 3,246,446
Patented Apr. 19, 1966

3,246,446
BAKERY ITEM COVER FORMING METHOD
Frank C. Powers, Storm Lake, Iowa, assignor to Lapco, Inc., Freeport, Mich., a corporation of Delaware
Filed Sept. 10, 1962, Ser. No. 222,520
4 Claims. (Cl. 53—42)

This invention relates to a bowl cover and a method of forming the cover in situ on a container, and more particularly to a method of forming a transparent removable, re-useable bakery goods cover in place on the pan of finished bake goods.

Transparent freshness-sealing covers on bakery goods such as cakes and rolls, are conventionally not re-useable as bowl covers once they are removed from the pan. Thus, it is not possible to recover a partially consumed cake with the same cover, or to use the cover in other uses as a "bowl cover."

Further, fabrication of a removable transparent bowl cover in situ on the bakery pan containing a finished item has not been possible heretofore using heat application techniques since the heat normally causes wrinkling and discoloration to ruin the clarity and sheen of the transparent plastic film, and thus ruin the sales appeal of the item.

It is therefore an object of this invention to provide a novel method of forming a removable cover for bakery goods that not only serves excellently as the cover, but can also be reused subsequently as a "bowl cover." Moreover, the cover can be formed from relatively inexpensive materials and in an inexpensive manner.

It is another object of this invention to provide a method of forming in situ a removable, re-useable transparent bakery goods cover on the container, without adversely affecting the clarity or sheen of the plastic film over the goods. Moreover, the novel method uses heat application techniques including hot air blowing and heat sealing steps.

It is another object of this invention to provide a novel "bowl cover" capable of formation by inexpensive fabrication techniques and re-useable in a variety of ways.

These and other objects of this invention will be apparent upon studying the following specification in conjunction with the drawings in which.

Basically, the inventive method comprises the steps of placing a sheet of flexible transparent plastic film over the open side of a pan so as to have an overlapping periphery, snugging the overlapping edge of the film around the edge of the pan with an elastic band such as a conventional rubber band, protecting the main portion of the sheet from loss of sheen or clarity as by inverting the pan and sheet, simultaneously folding down the overlapping edge of the sheet around the elastic band, preferably by blowing hot air downwardly on the edge, and then securing the folded down edge to the adjacent sheet material, preferably by heat sealing using a hot platen, hot air or flame to secure the band in place on the periphery of the sheet.

The inventive bowl cover comprises a sheet of flexible, transparent, thermoplastic film material having an elastic band secured to the periphery of the film by the edge portion of the sheet being overlapped over the band and secured as by heat sealing to the adjacent portions of the sheet.

Figure 1:
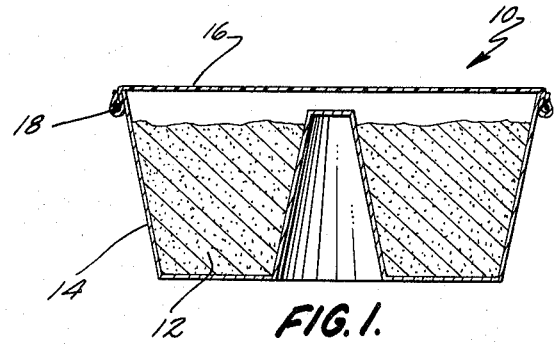
FIG. 1 is a sectional view of a finished cake product with the novel cover in place over the open side of the pan.

Referring now to the drawings, in FIG. 1 the bakery product 10 is in the form of a baked angel food cake 12 inside pan 14. The cake is preferably handled and merchandised in the same pan in which it was baked. Its open side is covered by the removable "bowl cover" 16 to preserve its freshness. This bowl cover comprises a sheet of flexible, thermoplastic, transparent heat sealing film having high clarity and sheen for optimum sales appeal for the item in the pan. The film may be of any suitable material such as a vinyl plastic, methyl methacrylate, polyethylene, or others, provided it possesses heat sealing capacity and proper clarity and sheen. The flexible bowl cover has an elastic band 18 in the periphery thereof. It is formed in situ on the bowl or pan according to this novel method.

Figure 2:
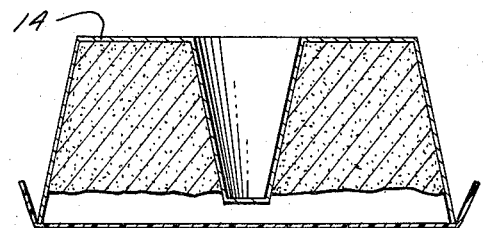
FIG. 2 is a sectional view of an inverted cake and pan showing the first step in the formation of the novel cover in place on the pan.

Maximum production conditions are obtained using heat sealing and hot air forming techniques. Ordinarily, such techniques are not useable to form a re-useable bowl cover since the heat required would substantially reduce the sheen and clarity of the covering film. According to the novel method, the main portion 16' of the initial flexible sheet or film is protected from the heat by forming the novel bowl cover directly on the final product. The container 14 to be covered is inverted on the sheet as illustrated in FIG. 2, to protect the main covering portion of the film. Thus, not only is production aided by forming the re-useable cover directly in place on the bowl cover, but also the film is protected by the actual pan itself.

Figure 3:
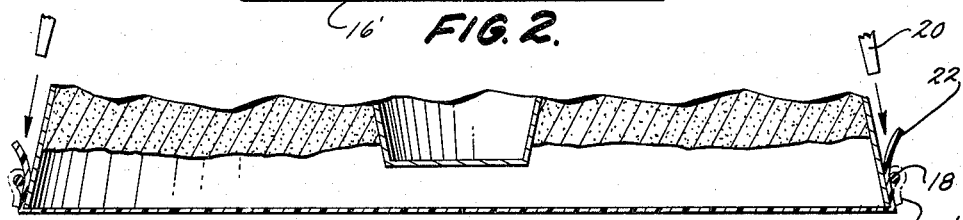
FIG. 3 is a fragmentary sectional view showing the second step of formation of the cover.
Figure 4:
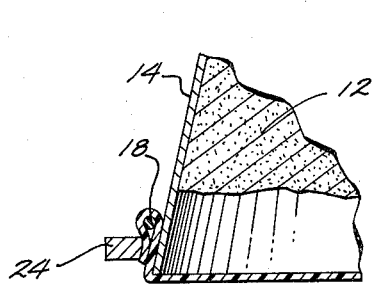
FIG. 4 is a fragmentary sectional view of the pan and cover showing the third step of formation.

The sheet is of course larger than the open side of the container to create a peripheral overlapping edge 22. This edge is snugged or gripped to the pan with an elastic band 18 such as a conventional rubber band (FIG. 3). In order to secure the band in place in the peripheral portion of the sheet or film, the edge of the film is deformed downwardly around the band, preferably by blowing hot air from suitable nozzles 20 against the thermoplastic film to soften it and deform it downwardly as shown in phantom at 22' in FIG. 3. The overlapping folded edge is then secured around the band to the adjacent plastic sheet material, preferably by heat sealing techniques. This may be achieved by pressing an annular hot platen 24 against the portions as illustrated in FIG. 4. Alternatively, hot flame 26 or hot gases may be used to fuse and securely seal the adjacent portions together around band 18.

Figure 5:
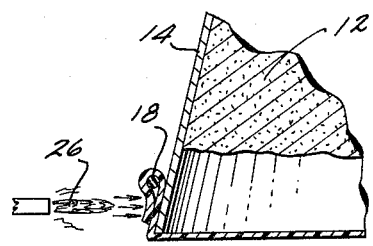
FIG. 5 is a fragmentary sectional view of the pan and cover and showing an alternative step to that illustrated in FIG. 4.

During the successive heat application steps, the bottom portion 16' of the sheet is not at all affected, and therefore upon inversion of the bakery item to the position illustrated in FIG. 1, the sales appeal rendered by the clarity and sheen of the sealing plastic sheet or film is not lessened. It is conceivable that, instead of the heat sealing techniques illustrated in FIG. 4 or 5, the edges may be secured by an adhesive. However, the heat sealing techniques are preferred due to the speed of operation and the reliability of the product.

It will be realized that the cover produced directly in place on the bakery goods facilitates high speed, inexpensive production operations. The baking and distributing pan 14 is immediately ready for marketing without requiring separate stitching, etc., necessary for a re-useable bowl cover. The bowl cover may be reused in dozens of ways well-known to the housewife, thereby lending even greater sales appeal to the product.

Certain obvious modifications of the method and article may occur to those in the art upon studying the illustrative form of the invention described. These are

I claim:

1. A method of covering the open side of a container with a re-useable cover comprising the steps of: placing a flexible thermoplastic overlapping film over the open side of the container; placing an elastic band around the overlapping portion of said film and the edge of said open side; inverting said container to place said film in a protected covered position; blowing hot air down onto the peripheral edge of said film to fold it over said band; and securing said folded edge around said band, whereby said sheet and band comprise a removable and replaceable cover.

2. The method in claim 1 wherein said securing step is effected by contacting said edge and adjacent sheet portions with a hot platen.

3. The method in claim 1 wherein said securing step is effected by blowing hot gases against said edge and adjacent sheet portions.

4. A method of forming a transparent cover in situ on a bakery pan without discoloring the central portion through which the goods are viewed, and enabling the cover to be removed and reused as a cover, comprising the steps of: placing a flexible thermoplastic heat sealable film over the open side of the pan with portions overlapping the edge of the pan; snapping a resilient band down around the edge of the film and the pan to hold the film in place; inverting said pan onto said film to place said film in a protected condition, blasting hot air down on the peripheral edge of said sheet to soften it and fold it down over said band; and heat sealing said folded edge to the adjacent portions of said film, thereby integrating said film and band into a removable and re-useable bowl cover.

References Cited by the Examiner

UNITED STATES PATENTS

| | | | |
|---|---|---|---|
| 2,064,411 | 12/1936 | Brandstein | 206—46 |
| 2,432,662 | 12/1947 | Gardner | 150—52 |
| 2,490,451 | 12/1949 | Magid | 150—52 X |
| 2,768,107 | 10/1956 | Magid | 229—48 |
| 2,836,339 | 5/1958 | Pringle. | |
| 2,976,655 | 3/1961 | Dreyfus et al. | 53—30 X |
| 3,085,375 | 4/1963 | Harrison | 53—30 |

FRANK E. BAILEY, *Primary Examiner.*

EARLE DRUMMOND, *Examiner.*